United States Patent
Wang et al.

(10) Patent No.: US 11,379,711 B2
(45) Date of Patent: Jul. 5, 2022

(54) VIDEO ACTION DETECTION METHOD BASED ON CONVOLUTIONAL NEURAL NETWORK

(71) Applicant: Peking University Shenzhen Graduate School, Shenzhen (CN)

(72) Inventors: Wenmin Wang, Shenzhen (CN); Zhihao Li, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Hui Zhao, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 548 days.

(21) Appl. No.: 16/414,783

(22) PCT Filed: Aug. 16, 2017

(86) PCT No.: PCT/CN2017/097610
§ 371 (c)(1),
(2) Date: May 17, 2019

(87) PCT Pub. No.: WO2018/171109
PCT Pub. Date: Sep. 27, 2018

(65) Prior Publication Data
US 2020/0057935 A1    Feb. 20, 2020

(30) Foreign Application Priority Data
Mar. 23, 2017   (CN) .......................... 201710177579.2

(51) Int. Cl.
*G06K 9/62* (2022.01)
*G06N 3/04* (2006.01)
(Continued)

(52) U.S. Cl.
CPC .......... *G06N 3/0472* (2013.01); *G06F 17/15* (2013.01); *G06F 17/18* (2013.01); *G06K 9/6267* (2013.01); *G06N 3/08* (2013.01)

(58) Field of Classification Search
CPC ....................................................... G06K 9/62
See application file for complete search history.

(56) References Cited

U.S. PATENT DOCUMENTS 9,836,853 B1 * 12/2017 Médioni ................... G06N 3/04
2011/0182469 A1 * 7/2011 Ji .......................... G06V 10/454
382/103

(Continued)

*Primary Examiner* — Jae U Jeon
(74) *Attorney, Agent, or Firm* — SV Patent Service

(57) ABSTRACT

A video action detection method based on a convolutional neural network (CNN) is disclosed in the field of computer vision recognition technologies. A temporal-spatial pyramid pooling layer is added to a network structure, which eliminates limitations on input by a network, speeds up training and detection, and improves performance of video action classification and time location. The disclosed convolutional neural network includes a convolutional layer, a common pooling layer, a temporal-spatial pyramid pooling layer and a full connection layer. The outputs of the convolutional neural network include a category classification output layer and a time localization calculation result output layer. The disclosed method does not require down-sampling to obtain video clips of different durations, but instead utilizes direct input of the whole video at once, improving efficiency. Moreover, the network is trained by using video clips of the same frequency without increasing differences within a category, thus reducing the learning burden of the network, achieving faster model convergence and better detection.

6 Claims, 3 Drawing Sheets

(3A)

(3B)

(51) Int. Cl.
G06F 17/15 (2006.01)
G06F 17/18 (2006.01)
G06N 3/08 (2006.01)

(56) References Cited

U.S. PATENT DOCUMENTS

| | | | | |
|---|---|---|---|---|
| 2017/0243058 A1* | 8/2017 | Tan | .................. | G06V 30/194 |
| 2018/0075336 A1* | 3/2018 | Huang | .................. | G06N 3/0454 |
| 2018/0089562 A1* | 3/2018 | Jin | .................. | G06F 17/15 |
| 2019/0164290 A1* | 5/2019 | Wang | .................. | G06V 10/94 |

\* cited by examiner

VIDEO ACTION DETECTION METHOD BASED ON CONVOLUTIONAL NEURAL NETWORK

TECHNICAL FIELD

The present invention relates to the field of computer vision recognition technologies, and specifically, to a video action detection method based on a convolutional neural network (CNN).

BACKGROUND OF THE INVENTION

Almost everyone has a cell phone in modern society in recent years. A camera is set for each phone. With the development of the Internet and the advancement of communication technology, people are more and more fond of shooting video and uploading it to the Internet, so the number of videos is exploding, and storage and analysis technology of video are very important.

Video action detection refers to classifying actions in videos, which gives the start times and end times of the actions (FIG. 1). In recent years, video action recognition tasks have made great progress, but mainly on videos that have been cut, that is, there is only one action in a video without redundant frames. Researchers also began to study uncut videos, which involves the task of video action detection.

The mainstream approach used in video tasks in the past was to extract traditional features manually and then combining with a modeling method. This type of method that produces the best effect extracts traditional features based on improved Dense Trajectory (iDT) combined with Fisher Vector (FV) modeling.

CNN (Convolutional Neural Network) technology has made great breakthroughs in image tasks and video action recognition tasks. Researchers began to apply CNN to video action detection tasks. Some scholars have tried to extract frame-level features of videos using CNN, and then combined with traditional features. However, in this kind of methods, it is difficult to use 2D CNN to extract action information in videos, which is important for modeling and determining time boundary of the actions (i.e., the start time and the end time).

Subject to this limitation, some scholars have proposed 3D (2D spatial+temporal) Convolutional Neural Network (CNN) (3D CNN), and segment Convolutional Neural Network (CNN) (Segment-CNN, S-CNN). These methods extract segments of different scales from videos, and process with three networks of the same structure. The three networks have the following characteristics:

The first is Proposal Network, which performs a simple secondary classification of the segments, removes non-action segments, and inputs action segments into the second network;

The second is Classification Network, which gives the specific category of the segments (including the category "background"). The third network is initialized with parameters of Classification Network; and The third is Localization Network. The coincidence rate between the segments and the actual video action segments (Ground Truths) are considered in the Loss Function, so that the higher the coincidence rate of segments is, the higher the confidence is, which is convenient for determining time boundaries of actions during post-processing.

However, some researchers believe that the independently operations of the three networks can hinder information sharing between the networks in the above methods. The three networks also consume a lot of computing resources and time in the training phase. At the same time, the overall effect on the upside is limited by the Proposal Network. It is thus proposed to integrate the networks at the three stages into a single network for multi-task learning. However, these methods all have a limitation: the size of the video clips input into the network is required to be consistent, specifically, the number of frames of the video clips must be consistent. In the above methods, segments of different time lengths are acquired by controlling the frequency of downsampling. For example, one frame is taken every two frames, or every four frames, or every eight frames . . . . The fragments obtained at different sampling frequencies are processed by the same network structure, so the following problems may occur:

First, sparse sampling will destroy the continuity within an action, so that 3D CNN cannot learn relatively good action features; and Second, video clips acquired at different sampling frequencies share a network for training, which increases intra-class differences and increases the burden of network learning, which thus requires more complex networks and more training data.

SUMMARY OF THE INVENTION

To overcome the above described deficiencies in the conventional techniques, the present invention provides a CNN-based video action detection method, which does not require consistent sizes of input video segments. The disclosed method adds a temporal-spatial pyramid pooling layer to a traditional network structure, which eliminates limitations on the inputs to the network, speeds up training and detection, can better extract action information in videos and improve the performances of video action classification and time location.

The core features of the present invention are as follows: firstly, a temporal-spatial pyramid pooling layer is added between the last convolutional layer and the first full connection layer of a traditional CNN; secondly, the entire video is input into the network, processing features corresponding to the region of interest in the last layer of the feature map, obtaining features of uniform size, inputting into the full connection layer and conducting classification. A temporal-spatial pyramid pooling layer is added in the traditional CNN structure, which has the following advantages: firstly, regardless of input sizes, the temporal-spatial pyramid pooling layer can provide outputs of a uniform size, which cannot be accomplished by the pooling layer of a conventional sliding window; secondly, the temporal-spatial pyramid pooling layer can provide multi-level and more robust temporal-spatial features, while the conventional pooling method can only provide features of a single level; and thirdly, due to different input sizes, the temporal-spatial pyramid pooling layer can pool features extracted at different sizes.

In general, the existing convolutional neural network comprises two parts: a convolutional layer and a subsequent full connection layer. The convolution layer operates in the form of a sliding window. Because of its weight sharing, the size of input to the network is not required to be consistent, and a feature map of any size can be generated. However, the full connection layer, by definition, requires a uniform input size. Therefore, inputs of same size are required in conventional methods, especially videos. In conventional methods, the requirement of the same input size due to the full connection layer behind the network. Therefore, by adding temporal-spatial pyramid pooling layers to 3D CNN, the presently disclosed method eliminates limitations on the uniform (fixed) size input by the 3D CNN network. A temporal-spatial pyramid pooling layer is adopted as the last pooling layer of the 3D CNN network, that is, a temporal-spatial pyramid pooling layer is added between the last convolutional layer and the first full connection layer of the 3D CNN network, so that the full connection layer in the network acquires an input of uniform size.

The technical scheme proposed in the present invention:

A video action detection method based on a convolutional neural network (CNN) is disclosed in this present invention. By adding a temporal-spatial pyramid pooling layer to a network structure, limitations on input by a network are eliminated, training and detection are sped up, and performance of video action classification and time location is improved. The convolutional neural network can include a convolutional layer, a common pooling layer, a temporal-spatial pyramid pooling layer and a full connection layer.

The method can include the following steps:

Step 1: in a training phase, performing the following steps:

Step 11) inputting a training video in a CNN model to obtain a feature map;

Step 12) acquiring segments of different lengths in the training video, and selecting positive samples and negative samples from the actual video action segments (ground truth) as training samples;

Step 13) inputting the corresponding feature region of the training samples in the feature map into the temporal-spatial pyramid pooling layer to obtain a feature expression of uniform size;

Step 14) inputting the features of the uniform size into the full connection layer, defining a Loss Function, obtaining a loss value; performing backpropagation, adjusting the parameters in the model, and performing training; and Step 15) gradually reducing the learning rate of training; obtaining the trained model when the training loss is no longer falling;

Step 2: in a detection phase, performing the following steps:

Step 21) inputting an entire video to be detected into the trained model obtained in Step 15);

Step 22) extracting segments of different lengths in the video to-be-detected, acquiring the feature regions of the corresponding segments in the feature layer of the network, and inputting into the temporal-spatial pyramid pooling layer to obtain a feature expression of uniform size; and Step 23) discriminating the features of the uniform size to obtain a classification confidence; and finally selecting that with the highest confidence as the final positioning result and category. The confidence of the classification is the output of the full connection layer at the end of the model.

The disclosed CNN-based video action detection method adds a temporal-spatial pyramid pooling layer to a network structure, so that the temporal-spatial pyramid pooling layer can pool the features extracted at different sizes regardless of input sizes and can provide output of uniform size. In addition, the temporal-spatial pyramid pooling layer can provide multi-level and more robust temporal-spatial features. In some aspects of the disclosed method, a Stochastic Gradient Descent mode can be used in the training phase to learn parameters until convergence. In the test phase, the sample is obtained in the same way as the training phase. After the output is obtained and the segment with the highest score is selected, the class of the action occurring in the video, the start time and the end time of the action are obtained.

Compared with the conventional methods, the beneficial effects of the present invention are:

The disclosed CNN-based video action detection method adds a temporal-spatial pyramid pooling layer to a traditional network structure. The technical advantages thereof are as follows: firstly, regardless of input sizes, the temporal-spatial pyramid pooling layer can provide outputs of a uniform size, which cannot be accomplished by the pooling layer of a conventional sliding window; secondly, the temporal-spatial pyramid pooling layer can provide multi-level and more robust temporal-spatial features, while the conventional pooling method can only provide features of a single level; and thirdly, due to different input sizes, the temporal-spatial pyramid pooling layer can pool features extracted at different sizes.

The disclosed method adds a temporal-spatial pyramid pooling layer to a traditional network structure, which eliminates limitations on the inputs to the network, speeds up training and detection, can better extract action information in videos and improve the performances of video action classification and time location. Specifically, the disclosed method can detect and recognize actions in the video, without requiring down-sampling to obtain video clips of different durations. Instead, the whole video is input directly at once, which reduces multiple inputs to a single input, thus improving efficiency. At the same time, the network is trained using video clips of the same frequency (without downsampling) which does not increase differences within a category, thus reduce the learning burden of the network, and can achieve faster model convergence and result in better detection effectiveness.

DETAILED DESCRIPTION OF THE INVENTION

The present invention will become apparent from the following detailed description of embodiments and from the accompanying drawings, but not limited to the scope of the invention in any way.

In some embodiments, a CNN-based video action detection method adds a temporal-spatial pyramid pooling layer to a traditional network structure. Limitations on input by a network are eliminated, training and detection are sped up, the action information in the video is mined better, and performance of video action classification and time location is improved. The invention does not require input video segments to be of uniform size.

Figure 1:
FIG. 1 is a schematic diagram showing video action detection and recognition and the start and the end times of a video action.
Figure 2:
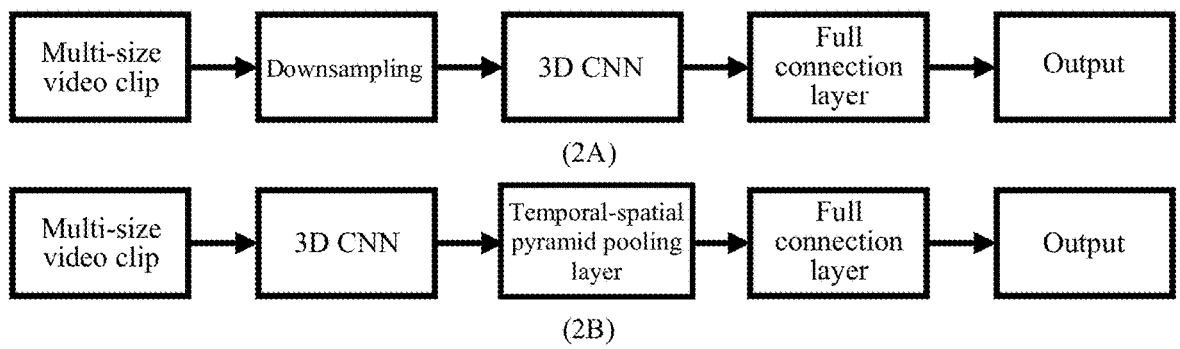
FIG. 2 is a flowchart of the presently disclosed method (2A) and a conventional method (2B)
Figure 3:
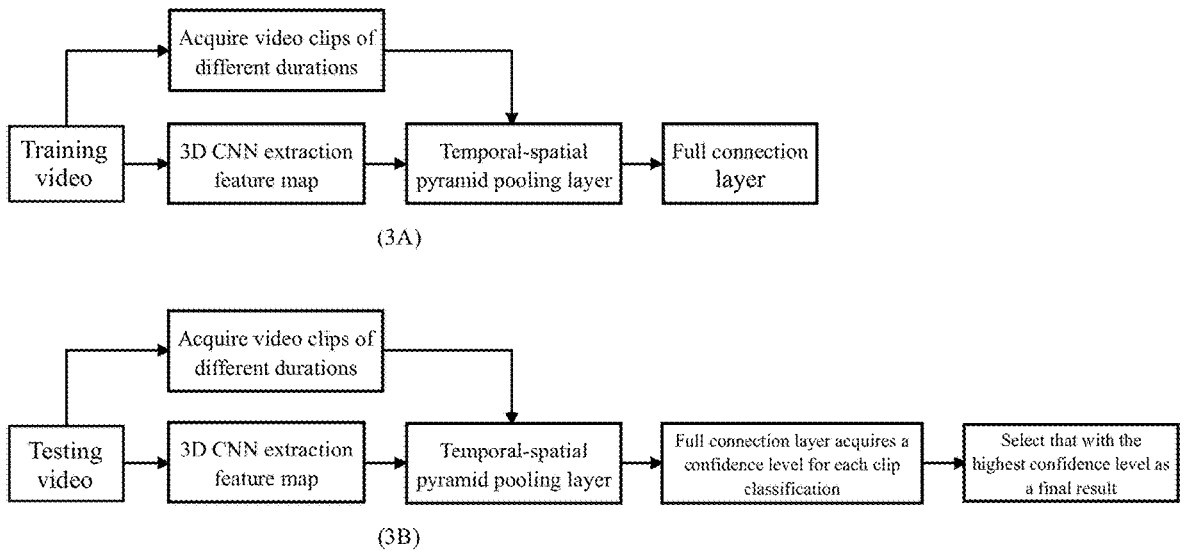
FIG. 3 is a flow chart of the training phase (3A) and the test phase (3B) of the present method.

As shown in FIG. 2, since the traditional CNN requires the input video segments to be of the same size, the video segments need to be down sampled before being input into the network. The downsampling process is eliminated in the present invention by adding a temporal-spatial pyramid pooling layer between the last convolutional layer and the first full connection layer. FIGS. 3A and 3B are flow charts respectively for the training phase and the test phase of the disclosed method.

Figure 4:
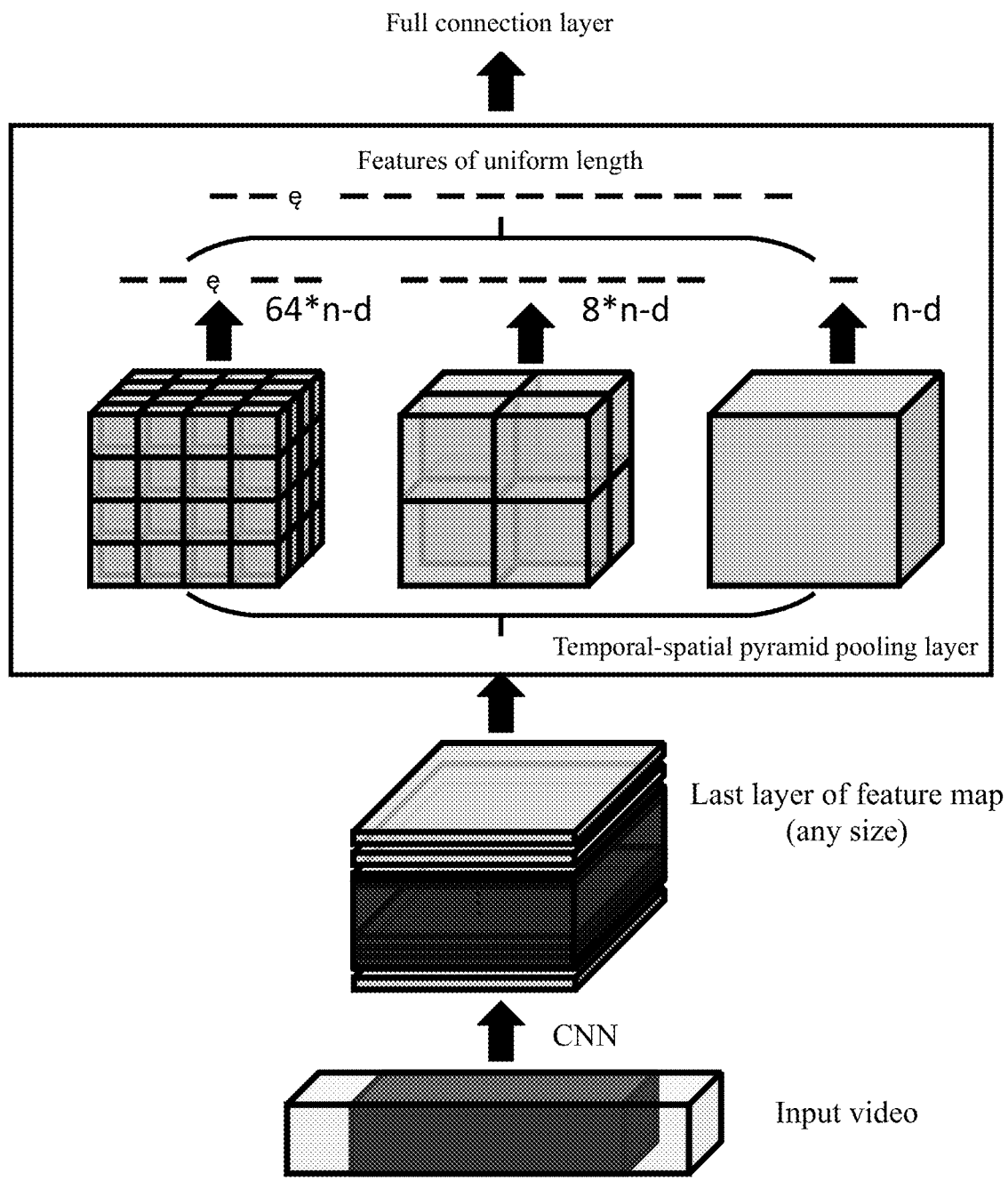
FIG. 4 shows a CNN in which a temporal-spatial pyramid pooling layer is added to a network according to the present invention.

FIG. 4 is a block diagram of a convolutional neural network (CNN) with the addition of a temporal-spatial pyramid pooling layer according to the present invention. As shown in FIG. 4, the temporal-spatial pyramid pooling layer can generate features of uniform size. The pooling can be divided into n levels. Set the size of the last layer of the feature map as W*H*T, and the division of each level is as follows:

At the first level:

The entire feature map can be considered as an area with a size of W*H*T;

At the k-th (k>1 and k≤n) level:

The entire feature map is divided into $2^{k-1}*2^{k-1}*2^{k-1}$ regions, starting from the front left upper corner. The size of the $(2^{k-1}-1)*(2^{k-1}-1)*(2^{k-1}-1)$ regions in the front left upper corner is $\lfloor W/2^{k-1} \rfloor * \lfloor H/2^{k-1} \rfloor * \lfloor T/2^{k-1} \rfloor$, the size of the remaining areas is set as the remaining one based on this, e.g., $W-\lfloor W/2^{k-1} \rfloor*(2^{k-1}-1)$, $H-\lfloor H/2^{k-1} \rfloor*(2^{k-1}-1)$, $T-\lfloor T/2^{k-1} \rfloor*(2^{k-1}-1)$.

In some embodiments, k is set as 3. At the first level, it can be divided into 4*4*4 regions. If the size of the last layer of feature map is W*H*T, the size of the 3*3*3 regions in the front left upper corner is $\lfloor W/4 \rfloor * \lfloor H/4 \rfloor * \lfloor T/4 \rfloor$ ($\lfloor \ \rfloor$ is the round-down symbol), and the size of the remaining regions are based on this. At the second level, we can divide it into 2*2*2 regions, and the calculation of size of each area is similar to that of the first level. In the third level, we can consider the entire feature map as a region. The Max Pooling method can be adopted in each region, that is, taking the maximum value.

Processing of Input Samples:

If each frame of a segment is input into the network, it can cause two problems: first, the change between adjacent frames is relatively small, and the action information is limited, which is somewhat redundant; and second, the number of frames input into the network is relatively high, making the network take up too much memory.

Therefore, in some embodiments, one frame is taken every three frames, so that the number of frames input into the network is reduced, and the memory burden caused by the redundant frames is reduced.

In some embodiments, positive and negative samples can be obtained by sliding window, that is, sliding to obtain at different time lengths, including 16, 31, 61, 121, 241 and 481 and an overlap rate of 75%. The Intersection-over-Union (IoU) method is used as a criterion for dividing positive and negative samples in the present invention.

The positive sample is only required to satisfy one of the following two conditions: first, the IoU value with the true label is the largest; and second, the IoU value with the true label is greater than 0.7.

In general, under the second condition, multiple positive samples can be obtained in one video, so enough positive samples can be obtained if the second condition is met. However, in some cases, positive samples cannot be obtained under the second condition. It can be guaranteed that at least one positive sample can be obtained under the first condition. The negative sample satisfies the following conditions: the IoU value with the true label is less than 0.3.

Other samples that are neither positive nor negative are not involved in training.

Input the feature of the last layer of the convolution layer corresponding to the sample into the temporal-spatial pyramid pooling layer to obtain a feature of uniform size, and then input into the network of the next layer.

Figure 5:
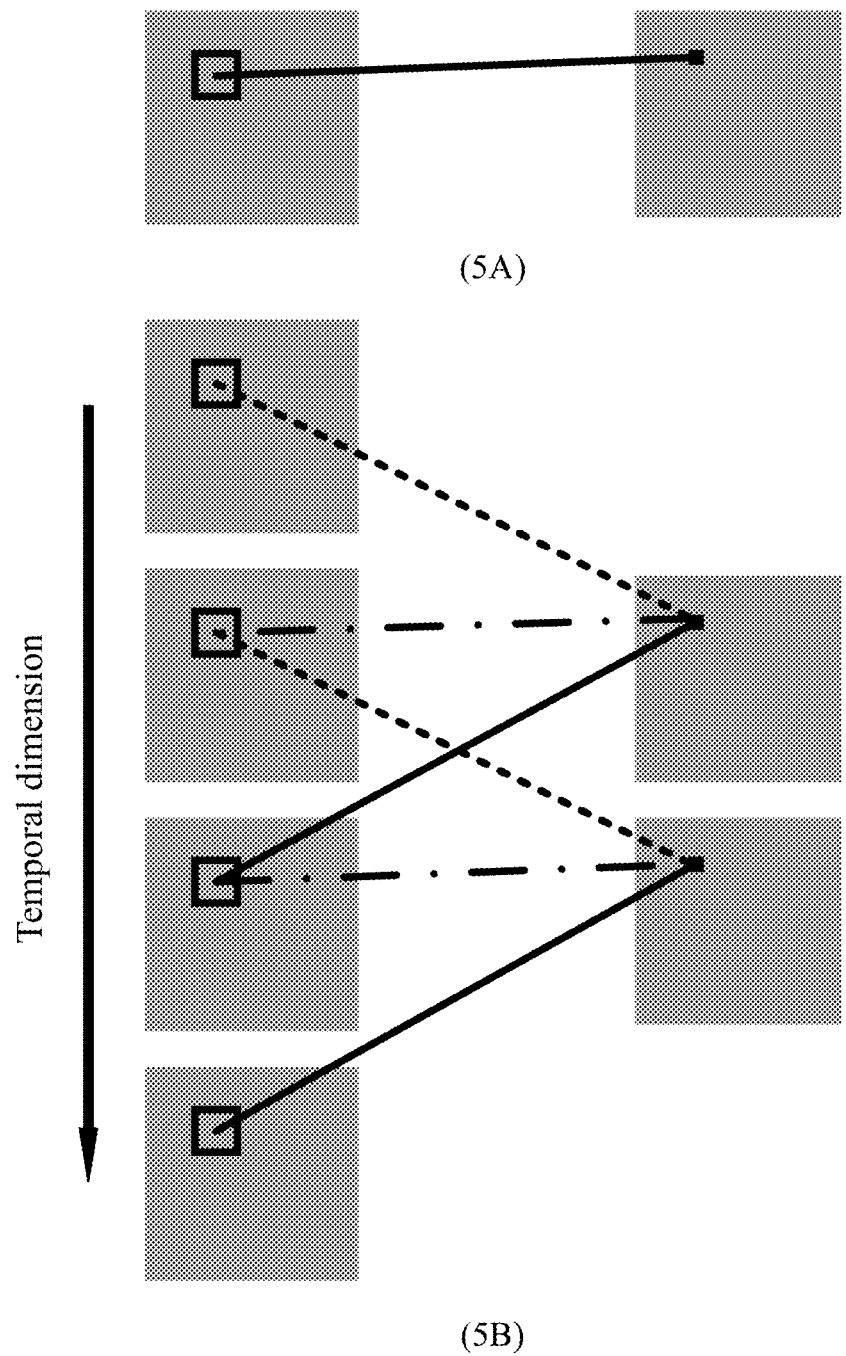
FIG. 5 illustrates the difference between 3D convolution (5A) and 2D convolution (5B).

Network Structure:

The present method is implemented on a 3D convolutional neural network (CNN) structure. The 3D CNN treats the temporal dimension and the spatial dimension equally and simultaneously, uses a 3D convolution kernel in the convolution operation, and also performs a 3D pooling in the pooling operation. The difference between 2D convolution and 3D convolution is shown in FIG. 5.

In some embodiments, a maximum pooling operation is adopted for all pooling operations, by using a size of 2*2 and a step of 2 in the spatial dimension, and different values at different layers in the temporal dimension; and the size of convolution kernel of all convolution operations is 3*3*3, and the step in the temporal-spatial dimension is 1. There are two types of network structures. One is a structure with a full connection layer, and the other is a structure without a full connection layer, that is, a full convolution structure.

Structure A with a full connection layer is represented as:

conv1a(64)-pool1(1,1)-conv2a(128)-pool2(2,2)-conv3a (256)-conv3b(256)-pool3(2,2)-conv4a(512)-conv4b(512)-pool4(2,2)-conv5a(512)-conv5b(512)-pool_pyramid-fc6 (4096)-fc7(4096)-fc8(K+1).

Structure B without a full connection layer is represented as:

conv1a(64)-pool1(1,1)-conv2a(128)-pool2(2,2)-conv3a (256)-conv3b(256)-pool3(2,2)-conv4a(512)-conv4b(512)-pool4(2,2)-conv5a(512)-conv5b(512)-pool_pyramid-fc8 (K+1).

where conv (the number of convolution kernels) represents the 3D convolutional layer, pool (the kernel dimension of the temporal dimension, the step of the temporal dimension) represents the 3D pooling layer, pool_pyramid represents the temporal-spatial pyramid pooling layer, and fc (the number of neurons) represents the full connection layer, K is the number of categories of action classification, and K+1 is an action without specified category. Structure B without the full connection layer is based on Fully Convolutional Networks (FCN), and the number of parameters is smaller than that of Structure A and B with a full connection layer. Both A and B structural variants are acceptable.

Output:

The network has two output layers at the end. One is the category classification, and the other is the time location regression calculation, which can be regarded as multi-task (2 tasks) learning.

The Loss Function can be defined as:

$$L(p,u,t^u,v)=L_{cls}(p,u)+\lambda[u\geq 1]L_{loc}(t^u,v) \quad (1)$$

where, $L_{cls}(p, u)=-\log p_u$; p is the probability distribution of samples over K+1 categories, $p=(p_0 \ldots, p_k)$; u is the real category; v is the real position of the sample on the time axis (i.e. start time and end time), $v=(v_b, v_e)$; $t^u$ is the calculated position, $t^u=(t_b^u, t_e^u)$; $\lambda$ is the parameter that controls the balance between the loss values of two tasks, with value ranging from 0 to positive infinity; and $[u\geq 1]$ is equal to 1 when the class represented by u is an action, and 0 otherwise;

$$L_{loc}(t^u, v) = -\log \frac{t^u \cap v}{t^u \cup v}$$

where, $t^u \cap v$ is the intersection of $t^u$ and v, and $t^u \cup v$ is the union of $t^u$ and v.

Training Phase:

In training phase, Stochastic Gradient Descent can be used to learn the parameters until convergence. In the embodiment of the present invention, the batch size is 256, and the ratio of the positive and negative samples is 1:1. If the quantity of positive samples is insufficient, supplement is made by using the negative samples. The momentum can be set as 0.9. The model trained on the Sports-1M data set by using the 3D convolutional network is used as the parameter for network initialization. The learning rate of the fc8 layer of the full connection layer is 0.01, and the learning rate of other layers is 0.0001. When the network converges, it drops to 1/10 of the original. Stop training after repeating twice.

Test Phase (Detection):

In the test phase, the sample is obtained in the same way as the training phase. The output of the last category classification of the network is the confidence level. After the output is obtained, the segment with the highest confidence is selected. the type of action that occurs in the video can be obtained, as well as the start time and end time of the action (that is, the output of time location regression calculation of the last layer of the network).

It is to be noted that the above contents are further detailed description of the present invention in connection with the disclosed embodiments. The invention is not limited to the embodiments referred to, but may be varied and modified by those skilled in the field without departing from the concept and scope of the present invention. The claimed scope of the present invention should be defined by the scope of the claims.

What is claimed is:

1. A video action detection method based on a convolutional neural network (CNN), wherein the convolutional neural network comprises a convolutional layer, a common pooling layer, a temporal-spatial pyramid pooling layer and a full connection layer, wherein the outputs of the convolutional neural network comprise a category classification output layer and a time localization calculation result output layer, the video motion detection method comprising:

Step 1: in a training phase, performing the following steps:

Step 11) inputting a training video in a CNN model to obtain a feature map;

Step 12) acquiring segments of different lengths in the training video, and selecting positive samples and negative samples from the actual video action segments (ground truth) as training samples;

Step 13) inputting the corresponding feature region of the training samples in the feature map into the temporal-spatial pyramid pooling layer to obtain a feature expression of uniform size;

Step 14) inputting the features of the uniform size into the full connection layer, defining a Loss Function, obtaining a loss value; performing backpropagation, adjusting the parameters in the model, and performing training; and Step 15) gradually reducing the learning rate of training; obtaining the trained model when the training loss is no longer falling; and Step 2: in a detection phase, performing the following steps:

Step 21) inputting an entire video to be detected into the trained model obtained in Step 15);

Step 22) extracting segments of different lengths in the video to-be-detected, acquiring the feature regions of the corresponding segments in the feature layer of the network, and inputting into the temporal-spatial pyramid pooling layer to obtain a feature expression of uniform size; and Step 23) discriminating the features of uniform size, and obtaining a classification confidence based on the category classification output layer; selecting the classification with the highest confidence, and obtaining the category of the action occurring in the video; obtaining a start time and an end time of the action according to time location output from the output layer, thereby fulfilling video action detection.

2. A video action detection method according to claim 1, wherein the convolutional neural network model employs a 3D convolutional neural network.

3. A video action detection method according to claim 1, wherein a temporal-spatial pyramid pooling layer is added to the convolutional neural network, wherein the temporal-spatial pyramid pooling layer is divided into n levels, wherein the size of the last layer of feature map is set as W*H*T, wherein the regions of each level are divided as follows:

a first level that includes the entire feature map, having an area size of W*H*T;

a k-th level, wherein the entire feature map is divided into $2^{k-1}*2^{k-1}*2^{k-1}$ regions, starting from the upper left upper corner, wherein the size of the $(2^{k-1}-1)*(2^{k-1}-1)*(2^{k-1}-1)$ regions in the front left upper corner is $\lfloor W/2^{k-1} \rfloor * \lfloor H/2^{k-1} \rfloor * \lfloor T/2^{k-1} \rfloor$, wherein the sizes of the remaining areas are obtained from a remainder: $(W-\lfloor W/2^{k-1} \rfloor*(2^{k-1}-1))*(H-\lfloor H/2^{k-1} \rfloor*(2^{k-1}-1))*(T-\lfloor T/2^{k-1} \rfloor*(2^{k-1}-1))$, where $1 < k \leq n$.

4. A video action detection method according to claim 1, wherein the positive samples and the negative samples are divided by Intersection-over-Union (IoU) method.

5. A video action detection method according to claim 1, wherein the Loss Function is defined as:

$$L(p, u, t^u, v) = L_{cls}(p, u) + \lambda[u \geq 1] L_{loc}(t^u, v) \quad (1)$$

where $L_{cls}(p, u) = -\log p_u$; p is the probability distribution of samples over K+1 categories, $p = (p_0 \ldots, p_k)$;

$$L_{loc}(t^u, v) = -\log \frac{t^u \cap v}{t^u \cup v};$$

$t^u \cap v$ is the intersection of $t^u$ and v, and $t^u \cup v$ is the union of $t^u$ and v;

u is the real category;

v is the real position of the sample on the time axis, i.e. start time and end time, $v = (v_b, v_e)$;

$t^u$ is the calculated position, $t^u = (t_b^u, t_e^u)$;

$[u \geq 1]$ is equal to 1 when the class represented by u is an action, and 0 otherwise, $\lambda$ is the parameter that controls the balance between the loss values of two tasks, with value ranging from 0 to positive infinity.

6. A video action detection method according to claim 1, wherein in the training phase, Stochastic Gradient Descent is used in the training phase to train the parameters until convergence.

* * * * *